Patented Jan. 19, 1926.

1,570,262

UNITED STATES PATENT OFFICE.

GEORG KRÄNZLEIN, OF SINDLINGEN, NEAR HOCHST-ON-THE-MAIN, AND MARTIN CORELL, OF HOCHST-ON-THE-MAIN, GERMANY, ASSIGNORS TO FARBWERKE VORM. MEISTER LUCIUS & BRUNING, OF HOCHST-ON-THE-MAIN, GERMANY, A CORPORATION OF GERMANY.

PROCESS OF PREPARING PROPYLENE-THIOHYDRIN OR PROPYLENE-ETHYLENE-THIOHYDRIN AND PRODUCTS OBTAINED THEREBY.

No Drawing. Application filed August 7, 1922. Serial No. 580,287.

*To all whom it may concern:*

Be it known that we, GEORG KRÄNZLEIN and MARTIN CORELL, citizens of Germany, residing at Sindlingen near Hochst-on-the-Main, and Hochst-on-the-Main, Germany, respectively, have invented certain new and useful Improvements in Processes of Preparing Propylene-Thiohydrin or Propylene-Ethylene-Thiohydrin and Products Obtained Thereby, of which the following is a specification.

We have found that the hitherto unknown propylene-thiohydrin of the constitution

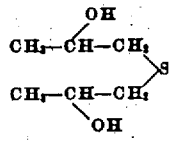

can be very easily prepared by causing propylene-chlorhydrin which is, for instance, produced by the addition of hypochlorous acid to propylene, to react with alkali sulphides.

This reaction was not to be foreseen since it is known that the introduction of alkyl groups frequently has a preventing effect on well known reactions. For instance, we may mention the strange impediment caused by the presence of alkyl groups to the preparation of amides etc. from aceto-acetic ester and malonic ester.

Besides by the present process there is obtained, contrary to the known process for the preparation of ethylenethiohydrin, not a primary but a secondary alcohol (viz. the representative of quite a different class of bodies), which is of interest as starting material for bodies newly to be prepared.

It is a surprising fact that the new secondary propylene-thiohydrin thus obtained possesses similarly valuable properties as its lower homologue: ethylene-thiohydrin. It is very readily soluble in water and possesses a high dissolving ability for many organic dyestuffs so that it renders excellent service in the art of dyestuff-printing. The thiohydrin which is produced from a mixture of ethylene- and propylene-chlorhydrins by treatment with alkali sulphides and which is probably a mixture of ethylene-thiohydrin, propylene-thiohydrin and ethylene-propylene-thiohydrin, shows similar properties. This fact is of great technical importance because it renders possible the direct use of olefinic gas mixtures for the preparation of the thiohydrins, such as oil gas "Blau" gas and some of the earth well gases which are available, with particular advantage.

The invention therefore embraces generally the preparation of thiohydrins of the general formula

wherein R stands for the propyleneglycol residue and $R_1$ stands for the propyleneglycol or ethyleneglycol residue by causing chlorhydrins of the general formula RCl and $R_1Cl$ wherein R and $R_1$ may stand for the propylene-residue and $R_1$ may also stand for the ethyleneglycol residue to react with alkali sulphides.

*Example.*

189 parts of propylene-chlorhydrin are run into 1000 parts of a normal solution of sodium sulphide during which operation the reaction manifests itself by rise of temperature. The mixture is then heated for a short time to boiling, evaporated in vacuo, the sodium chloride is separated by pressure and the crude thiohydrin distilled in a vacuum. At 4 mm. pressure the boiling point of the propylene-thiohydrin is at 120° C. If instead of propylene-chlorhydrin a mixture of propylene- and ethylene-chlorhydrin is used, the reaction and further treatment takes place in a quite analogous manner.

Having now described our invention, what we claim is:

1. As new products, the thiohydrins of the general formula

wherein R stands for the propyleneglycol residue and $R_1$ for the propyleneglycol-or ethyleneglycol residue, which are readily soluble in water and possess a high dissolving ability for many organic dyestuffs.

2. The process of preparing thiohydrins of the general formula $$\begin{matrix} R \\ R_1 \end{matrix} \!\!>\!\! S$$

wherein R stands for the propyleneglycol-residue and $R_1$ for the propyleneglycol-or ethyleneglycol residue, which consists in causing chlorhydrins of the formula RCl and $R_1$Cl, wherein R and $R_1$ may stand for the propylene-residue and $R_1$ may also stand for the ethyleneglycol residue, to react with alkali sulphides.

3. The process of preparing thiohydrins of the general formula $$\begin{matrix} R \\ R_1 \end{matrix} \!\!>\!\! S$$

wherein R stands for the propyleneglycol-residue and $R_1$ for the propyleneglycol-or ethyleneglycol residue, which consists in causing chlorhydrins of the formula RCl and $R_1$Cl, wherein R and $R_1$ may stand for the propylene-residue and $R_1$ may also stand for the ethyleneglycol residue, to react with alkali sulphides and in purifying after separation of the alkali chloride.

4. The process of preparing propylenethiohydrin which consists in causing propylenechlorhydrin to react with alkali sulphides.

5. The process of preparing propylenethiohydrin which consists in causing propylenechlorhydrin to react with alkali sulphides, and purifying after separation of the alkali chloride.

6. The process of preparing ethylene-propylenethiohydrin which consists in causing a mixture of propylenechlorhydrin and ethylene-chlorhydrin to react with alkali sulphides.

7. The process of preparing ethylene-propylenethiohydrin which consists in causing a mixture of propylenechlorhydrin and ethylenechlorhydrin to react with alkali sulphides, and purifying after separation of the alkali chloride.

In testimony whereof, we affix our signatures.

GEORG KRÄNZLEIN.
MARTIN CORELL.

soluble in water and possess a high dissolving ability for many organic dyestuffs.

2. The process of preparing thiohydrins of the general formula

wherein R stands for the propyleneglycol-residue and $R_1$ for the propyleneglycol-or ethyleneglycol residue, which consists in causing chlorhydrins of the formula RCl and $R_1$Cl, wherein R and $R_1$ may stand for the propylene-residue and $R_1$ may also stand for the ethyleneglycol residue, to react with alkali sulphides.

3. The process of preparing thiohydrins of the general formula

wherein R stands for the propyleneglycol-residue and $R_1$ for the propyleneglycol-or ethyleneglycol residue, which consists in causing chlorhydrins of the formula RCl and $R_1$Cl, wherein R and $R_1$ may stand for the propylene-residue and $R_1$ may also stand for the ethyleneglycol residue, to react with alkali sulphides and in purifying after separation of the alkali chloride.

4. The process of preparing propylene-thiohydrin which consists in causing propylenechlorhydrin to react with alkali sulphides.

5. The process of preparing propylene-thiohydrin which consists in causing propylenechlorhydrin to react with alkali sulphides, and purifying after separation of the alkali chloride.

6. The process of preparing ethylene-propylenethiohydrin which consists in causing a mixture of propylenechlorhydrin and ethylene-chlorhydrin to react with alkali sulphides.

7. The process of preparing ethylene-propylenethiohydrin which consists in causing a mixture of propylenechlorhydrin and ethylenechlorhydrin to react with alkali sulphides, and purifying after separation of the alkali chloride.

In testimony whereof, we affix our signatures.

GEORG KRÄNZLEIN.
MARTIN CORELL.

Certificate of Correction.

It is hereby certified that Letters Patent No. 1,570,262, granted January 19, 1926, upon the application of Georg Kränzlein, of Sindlingen, near Hochst-on-the-Main, and Martin Corell, of Hochst-on-the-Main, Germany, for an improvement in "Processes of Preparing Propylene-Thiohydrin or Propylene-Ethylene-Thiohydrin and Products Obtained Thereby," were erroneously issued to "Farbwerke vorm. Meister Lucius & Brüning, of Hochst-on-the-Main, Germany, a Corporation of Germany," whereas said Letters Patent should have been issued to *Grasselli Dyestuff Corporation, of New York, N. Y., a Corporation of Delaware,* said corporation being assignee by *mesne assignments* of the entire interest in said invention, as shown by the records of assignments in this office; and that the said Letters Patent should be read with this correction therein that the same may conform to the record of the case in the Patent Office.

Signed and sealed this 20th day of April, A. D. 1926.

[SEAL.]

M. J. MOORE,
*Acting Commissioner of Patents.*

Certificate of Correction.

It is hereby certified that Letters Patent No. 1,570,262, granted January 19, 1926, upon the application of Georg Kränzlein, of Sindlingen, near Hochst-on-the-Main, and Martin Corell, of Hochst-on-the-Main, Germany, for an improvement in " Processes of Preparing Propylene-Thiohydrin or Propylene-Ethylene-Thiohydrin and Products Obtained Thereby," were erroneously issued to " Farbwerke vorm. Meister Lucius & Brüning, of Hochst-on-the-Main, Germany, a Corporation of Germany," whereas said Letters Patent should have been issued to *Grasselli Dyestuff Corporation, of New York, N. Y., a Corporation of Delaware*, said corporation being assignee by *mesne assignments* of the entire interest in said invention, as shown by the records of assignments in this office; and that the said Letters Patent should be read with this correction therein that the same may conform to the record of the case in the Patent Office.

Signed and sealed this 20th day of April, A. D. 1926.

[SEAL.]

M. J. MOORE,
*Acting Commissioner of Patents.*